United States Patent

[11] 3,623,154

| [72] | Inventor | Hisashi Yonezu |
| | | Chita-gun, Aichi-ken, Japan |
| [21] | Appl. No. | 750,878 |
| [22] | Filed | Aug. 7, 1968 |
| [45] | Patented | Nov. 23, 1971 |
| [73] | Assignee | Nippon Denso Company Limited |
| | | Kariya-shi, Japan |
| [32] | Priority | June 13, 1968 |
| [33] | | Japan |
| [31] | | 43/40789 |

[54] FLASHER CIRCUIT FOR VEHICLES
9 Claims, 11 Drawing Figs.

[52] U.S. Cl.................................................. 340/81,
315/217, 317/148.5, 317/155.5
[51] Int. Cl..................................................... B60q 1/38
[50] Field of Search.......................................... 340/52, 55,
67, 71–73, 81–83, 251, 331; 317/155.5; 335/178

[56] References Cited
UNITED STATES PATENTS

| 1,580,313 | 4/1926 | McIntire | 340/251 |
| 2,878,431 | 3/1959 | Hull | 317/155.5 |
| 3,247,402 | 4/1966 | Hayden | 340/331 X |
| 3,487,358 | 12/1969 | Ubukata et al. | 340/81 F |
| 3,508,237 | 4/1970 | Kimmelman | 340/251 |
| 2,945,209 | 7/1960 | Berg | 340/71 |
| 3,099,756 | 7/1963 | Penfold et al. | 340/67 X |

Primary Examiner—John W. Caldwell
Assistant Examiner—Kenneth N. Leimer
Attorney—Cushman, Darby & Cushman ABSTRACT: A flasher for vehicles, wherein detection of current is effected by the steady state current of load lamps such as turn signal lamps so that said apparatus may be capable of detecting a burnout of the turn signal lamps when used as a turn signal flasher and capable of flashing the front and rear or left and right turn signal lamps in a stable manner at an adequate frequency when used as a hazard warning flasher.

INVENTOR

HISASHI YONEZU

BY Cushman, Darby + Cushman
ATTORNEYS

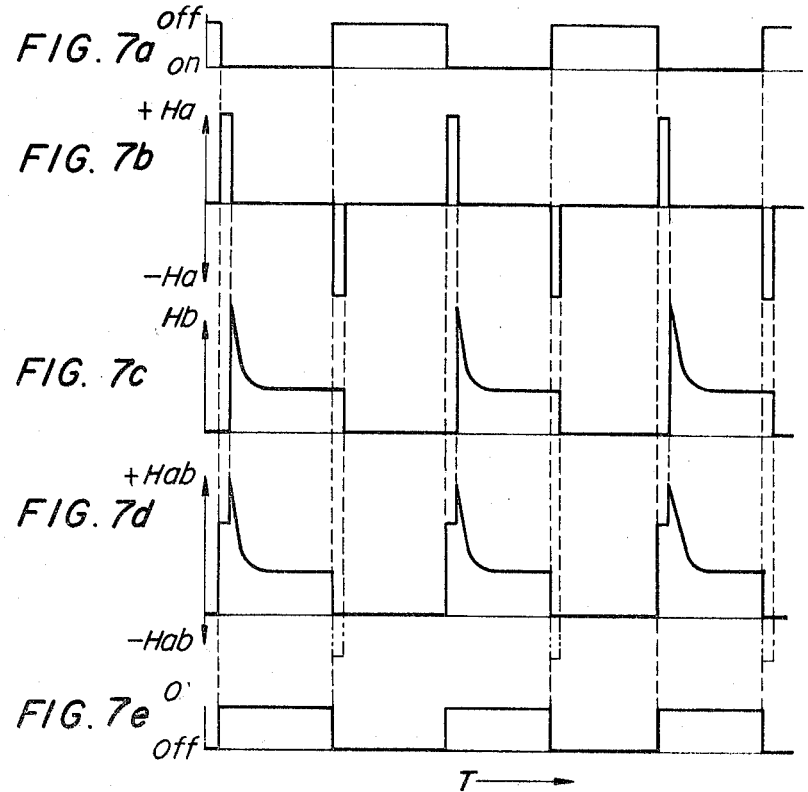

FLASHER CIRCUIT FOR VEHICLES

BACKGROUND OF THE INVENTION

1. Field of the Invention

The present invention relates to a flasher for use in vehicles, particularly automotive vehicles.

2. Description of the Prior Art

Flashers heretofore used in automotive vehicles are classified into direction turn signal flasher and hazard warning flasher, and the former is further classified into two types by the load current characteristics, i.e., the flasher of the so-called variable load-type characteristic wherein the flashing frequency remains unchanged irrespective of the magnitude of the load current, and the flasher of the so-called specific load-type characteristic wherein the flashing frequency varies greatly depending upon the magnitude of the load current. The flasher of the specific load current-type has frequently been employed as means by which the driver is made aware of a failure, such as a burnout, of direction turn signal lamps and there will probably be an increasing need for such a measure in the future from the standpoint of safety of automotive vehicles.

On the other hand, the hazard warning flasher apparatus by which the left and right or front and rear turn signal lamps are flashed simultaneously, is required to be capable of flashing the lamps at a constant frequency independently of a possible change in the load current of said turn signal lamps.

A flasher, which singly is capable of performing the function of the aforesaid turn signal flasher and the function of the hazard warning flasher, is advantageous in many respects, such as in reducing the cost, size and weight of the flasher and in simplifying the electric wiring thereof. In addition, such a flasher brings about the following advantage. Namely, the hazard warning flasher is used so rarely that it becomes necessary to check the flasher from time to time if the flasher is provided independently of turn signal flasher. However, if the hazard warning flasher simultaneously serves as the turn signal flasher, it is to be checked at all times and the driver can use the flasher as a hazard warning flasher with a sense of security in case of emergency.

As a flasher of the type described above which is capable of performing simultaneously the function of turn signal flasher and the function of hazard warning flasher, there has been known an arrangement wherein the coil of a current relay having a conductor of large diameter is connected across the load terminal of a flasher of variable load-type characteristic and lamps, whereby said current relay including said coil is controlled by the magnitude of the magnetomotive force created by a load current passing through said coil and the flashing operation of said flasher is controlled by said current relay. With such an arrangement, the flasher stops operating when the current relay becomes inoperative due to a decrease in load current, whereas it continues to flash the lamps at a predetermined frequency when the load current is increased. In other words, when one of the turn signal lamps has failed during operation of the flasher as a turn signal flasher, the rest of the turn signal lamps are kept on, thereby detecting the burnout of the lamp, while when the apparatus is used as a hazard warning flasher, it flashes the front and rear or left and right turn signal lamps at the same frequency as when the flasher is used as a turn signal flasher. This type of flasher, on the one hand, has the advantage that it enables the electric wiring of the associated automotive vehicle to be relatively easy since the apparatus is required to have only two terminals per se, but on the other hand, has the disadvantages namely that the current relay is needed besides the flashing device, that since the magnetomotive force is increased abruptly by the rush current of the turn signal lamps when the load current of the lamps flows through the coil of the current relay and decreased after a short while when the load current has returned to the steady state current, the arrangement must be made such that the current relay will not be actuated by the rush current when one of the turn signal lamps is burned out but will be actuated by the rush current when said lamps are in the normal condition and thus much difficulty is involved in the design of the apparatus, and further that there is the danger of the current relay becoming inoperative when the power source voltage drops sharply as a result of lighting the stop light or headlight, etc., during normal operation of the apparatus at the moment when the rush current is about to flow, with the consequence that the turnover value of the rush current is lowered.

As will be seen from the foregoing, the conventional flasher of the turn signal lamp burnout detecting type, which depends upon the rush current for load lamps, such as the direction indicator lamps, is not entirely satisfactory as safety means because not only it is difficult to control but also there is the danger that a normal flashing operation cannot be maintained when there occurs a sharp drop in power source voltage for a very short period of time.

SUMMARY OF THE INVENTION

It is an object of the present invention to provide an automotive flasher, which comprises a lamp load, a source terminal to be connected with a power source, an output terminal connected with the lamp load, an intermittent circuit for switching a first switch between a first and second positions periodically, a relay including a voltage coil, a current coil and a second switch, the voltage coil being supplied with a current in forward direction through the first switch at its first position and supplied with a reverse current through the first switch at its second position, the voltage coil producing an electromagnetic force so as to close the second switch by the forward current and an electromagnetic force so as to open said second switch by the reverse current, and the current coil producing an electromagnetic force so as to self-hold the first switch at the closing state.

It is another object of the present invention to provide an automotive flasher of the type described above, wherein load lamps are connected to the power source through an output terminal, the contacts of the relay, the current coil and the power source terminals.

It is still another object of the present invention to provide an automotive flasher of the type described in the aforesaid second object of the invention, wherein said load lamps are turn signal lamps which are connected to the power source through the movable contacts and the cooperating fixed contacts of a hazard warning switch which is electrically in parallel relation to said lamps, the movable contact and the fixed contacts of a turn signal switch, the output terminal, the contacts and the current coil of the relay and the power source terminal, and a switch composed of the movable contact and the fixed contact of said hazard warning switch is connected between said power source terminal and said power source in parallel to a power source switch.

The flasher of the present invention constructed as described above achieves the remarkable advantages listed below:

a. Selection of the number of load lamps and design work for detecting the burnout of a lamp can be made easily since the upper limit of the load current to be controlled can be determined by the magnetomotive force of the voltage coil and the lower limit thereof by the magnetomotive force of the current coil.

b. The flashing operation can be maintained even after the power voltage has dropped sharply momentarily with the value of the rush current flowing through the load lamps becoming small, since the rush current is not used to actuate the relay, and therefore the apparatus is of great practical advantage from the standpoint of safety.

c. Flashing of the load lamps can be controlled by one voltage coil and an intermittent circuit to switch the connection of said coil.

d. No substantial power is consumed because when the movable contact and the fixed contact of the voltage coil are engaged or disengaged with each other by the magnetomotive force of said coil, the potentials at both terminals of said coil become the same with no current flowing therethrough, whereas when the other terminal of said voltage coil is grounded for turning the load lamps off, the movable contact is opened or closed due to a magnetomotive force of opposite direction to that generated in the current coil, maintaining both terminals of the voltage coil at the same potential, and in either case the voltage coil only generates a positive or negative short pulse current.

e. When the apparatus is in the turn signal lamp flashing operation actuating the turn signal switch, a burnout of one turn signal lamp can be detected by a variation of the the "on time ratio" or flashing frequency, whereas when the apparatus is in the hazard warning flashing operation actuating the hazard warning switch, all the turn signal lamps can be flashed regardless of the positions of the turn signal switch and power source switch, and such hazard warning flashing operation can be obtained even when only one turn signal lamp is in the normal condition.

BRIEF DESCRIPTION OF THE DRAWINGS

FIGS. 1 to 6 inclusive are electric circuit diagrams showing six embodiments of the flasher for vehicles according to the present invention, and FIGS. 7a to 7e inclusive are waveform diagrams for the purpose of explaining the operation, mainly, of the circuit of FIG. 1 of all the embodiments shown.

DESCRIPTION OF THE PREFERRED EMBODIMENTS

Figure 1:
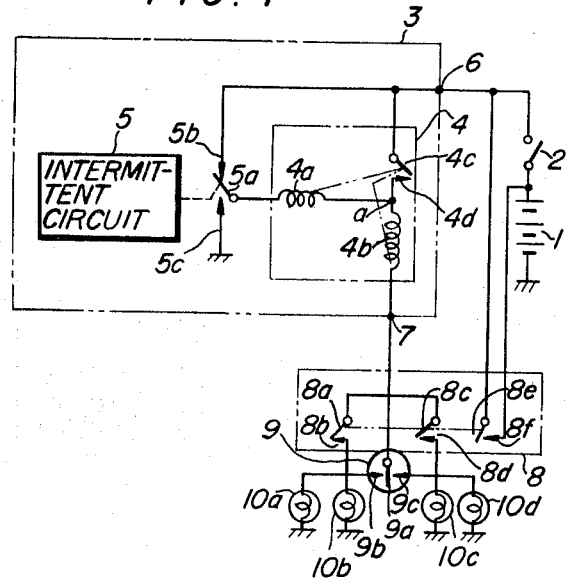

The present invention will be described by way of embodiments with to the accompanying drawings. Referring first to FIG. 1 which shows the basic electric wiring diagram of an embodiment of the present apparatus, a direct current power source 1 has its negative electrode grounded and positive electrode connected to a power terminal 6 of a flashing circuit 3 through a power source switch 2. The output terminal 7 of the flashing circuit 3 is connected to turn signal lamps 10a, 10b, 10c and 10d through the movable contacts 8a, 8c and the cooperating fixed contacts 8b, 8d of a hazard warning switch 8 and the movable contact 9a and fixed contacts 9b, 9c of a turn signal switch 9, said hazard warning switch 8 and said turn signal switch 9 being electrically in parallel to said blinking circuit 3. The power terminal 6 is connected to the output terminal 7 through the normally open movable contact 4c and fixed contact 4d, and a current coil 4b of a relay 4. A voltage coil 4a has one end connected to the connection a between the fixed contact 4d and the current coil 4b, and the other end to a movable contact 5a of an intermittent circuit 5 by which the flashing frequency of the present apparatus is determined. A normally closed fixed contact 5b, cooperating with the movable contact 5a, is connected to the power terminal 6 and a normally open fixed contact 5c is grounded. With the arrangement described, when the power source switch 2 is closed and then the movable contact 9a and fixed contact 9b of the turn signal switch 9 are connected with each other, a current flows through a circuit composed of the power terminal 6, normally fixed contact 5b, movable contact 5a, voltage coil 4a, current coil 4b, output terminal 7, movable contact 9a and fixed contact 9b of the turn signal switch 9 and turn signal lamps 10a, 10b. In this case, since the resistance of the voltage coil 4a is made considerably greater than the resistance of the current coil 4b and turn signal lamps 10a, 10b, the supply voltage is impressed across the terminals of the voltage coil 4a, so that the movable contact 4c and the fixed contact 4d of the relay 4 are contacted with each other by a magnetomotive force generated in the voltage coil 4a. Therefore, the supply voltage is impressed on the turn signal lamps 10a, 10b from the power terminal 6 through the movable contact 4c, fixed contact 4d, current coil 4b, output terminal 7 and turn signal switch 9, turning said turn signal lamps 10a, 10b on.

At this moment, a rush current several times greater than the steady state current flows through the current coil 4b, generating a large magnetomotive force therein. The current coil 4b is arranged so as to produce an electromagnetic force attracting the movable contact 4c towards the fixed contact 4d by this rush current, so that the electromagnetic force derived from the current coil is accumulated to the force derived from the voltage coil 4a. The above-mentioned rush current occurs in an early period of the turning-on of the turn signal lamp and returns to the steady state current in the meantime. However, since the movable contact 4c and the fixed contact 4d of the voltage coil 4a are shorted by contacting each other, the magnetomotive force disappears and the contact between said contacts 4c, 4d is maintained under the magnetomotive force generated by the steady state current for the turn signal lamp flowing through the current coil 4b. The number of turns of the current coil 5b is so selected that the movable contact 4c, which is maintained in contact with the fixed contact 4d under normal conditions of the turn signal lamps 10a, 10b, will be opened when either one of said turn signal lamps is burned out resulting in a decrease of the current passing through the current coil 4b. Therefore, when one of the lamps fails, the movable contact 4c is connected with the fixed contact 4d by the magnetomotive force of the voltage current 4a and the operation of the movable contact 4c is continued by the rush current flowing through the current coil 4b, and thereafter the movable contact 4c is disengaged from the fixed contact 4d at the point when the current flowing through the current coil 4b becomes the steady state current. FIG. 7a shows an on-off waveform of the normally closed contacts 5a, 5b of the intermittent circuit 5 relative to time. FIG. 7b shows the relationship between the magnetomotive force Ha generated in the voltage coil 4a and the time T, wherein (+) indicates the same direction as the direction of the magnetomotive force Hb of the current coil 4b shown in FIG. 7c and (−) indicates a direction opposite to the direction of said magnetomotive force. When the movable contact 5a of the intermittent circuit 5 is disengaged from the normally closed fixed contact 5b and brought into contact with the normally open fixed contact 5c depending upon the intermittent frequency of said circuit, a current flows through the power source terminal 6, movable contact 4c, fixed contact 4d, voltage coil 4a, movable contact 5a and normally open fixed contact 5c in the order mentioned. The direction of the magnetomotive force Ha, generated in the voltage coil 4a, is opposite to the direction of the magnetomotive force Hb, generated in the current coil 4b, as shown in FIGS. 7a and 7b, so that both magnetomotive forces offset each other causing the movable contact 4c to be disengaged from the fixed contact 4d. In this case, by arranging so that the magnitude of the magnetomotive force generated in the voltage coil 4a in a direction opposite to the magnetomotive force generated in the current coil 4b, is greater than the magnitude of the magnetomotive force generated by the current coil 4b during passage therethrough of a load current for all the front and rear or left and right turn signal lamps 10a, 10b, 10c and 10d for the hazard warning flashing operation, it is possible to erase the load current in either case of the turn signal operation and the hazard warning operation. FIG. 7d shows a waveform representing the total magnetomotive force Hb of the current coil 4b and voltage coil 4a, wherein the movable contact 4c is actuated by the voltage coil 4a and the rush current for the turn signal lamp does not directly contribute to the flashing operation.

Now, when one end of the voltage coil 4a, which has been connected with the power source terminal 6 through the movable contact 5a according to the frequency of the intermittent current 5, is grounded, the magnetomotive force Ha in an opposite direction to the magnetomotive force Hb of the current coil 4b is generated in the voltage coil 4a to offset each other, so that the movable contact 4c is disengaged from the fixed contact 4d as mentioned previously and at the same time the supply voltage is no longer imposed on the current coil 4b and voltage coil 4a, with the result that no magnetomotive force is present in the relay 4. In the manner described, the turn signal lamps are turned on and off repeatedly as shown in FIG. 7e. Incidentally, one side of the waveform shown in FIG. 7d is indicated by a phantom line. This is because the opposite magnetomotive force of the voltage coil 4a becomes zero at the same time when the movable contact 4c is disconnected from the fixed contact 4d. A current of an optional magnitude can be controlled by selecting the magnitude of the opposite magnetomotive force of the voltage coil 4a, while the burnout of a turn signal lamp of any size can be detected by selecting the magnitude of the magnetomotive force caused by the steady state current of a turn signal lamp passing through the current coil 4b as described before. According to the embodiment shown in FIG. 1 wherein the intermittent current 5 is completely independent of the relay 4, a burnout of the lamp is made known by the fact that the turn signal lamps are lighted only for a very short period of time when a magnetomotive force is generated in the voltage coil 4a with the movable contact 5a in contact with the normally closed fixed contact 5b and a rush current is flowing through the current coil 4b with the movable contact 4c in contact with the fixed contact 4d, that is to say that the burnout is made known by a change in the "on time ratio."

Figure 2:
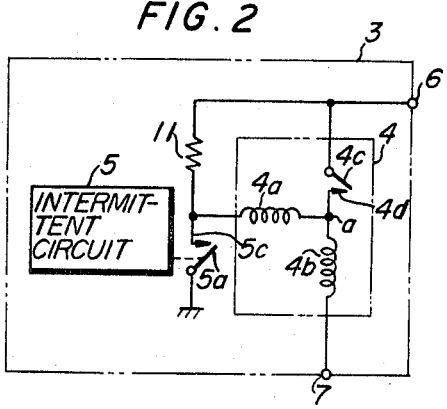

FIG. 2 shows the basic wiring diagram of the principal portion of another embodiment of the present apparatus. This embodiment differs from the preceding embodiment in that a resistor 11 is connected between the power source terminal 6 and the connection between the voltage coil 4a and the normally open fixed contact 5c, and in that the normally closed fixed contact 5b is omitted and the movable contact 5a is grounded. The apparatus of this embodiment operates in the following manner: Namely, when the movable contact 5a which is controlled by the intermittent circuit 5, is open and the turn signal lamps are connected to the output terminal 7, the supply voltage imposed on the power source terminal 6 flows through the voltage coil 4a through the resistor 11 to generate a magnetomotive force in said coil, so that the movable contact 4c is connected with the fixed contact 4d and a current flows through the turn signal lamps not shown through the current coil 4b. The magnetomotive force of the voltage coil 4a is erased by the contact of the movable contact 4c with the fixed contact 4d and said movable contact 4c continues its operation under the magnetomotive force of the current coil 4b. When the movable contact 5a is brought into contact with the normally open fixed contact 5c depending upon the intermittent frequency of the intermittent circuit 5, the direction of the current passing through the voltage coil 4a is reversed and the current flows into the ground from the movable contact 4c and fixed contact 4d through the normally open fixed contact 5c and movable contact 5a. Consequently the direction of the magnetomotive force is reversed with respect to that of the current coil 4b and the movable contact 4c is opened, whereby the turn signal lamp is put out. Further, when the movable contact 5a is disengaged from the normally open fixed contact 5c depending upon the frequency of the intermittent circuit 5, a current flows through the voltage coil 4a and again through the resistor 11. The turn signal lamps are put on and off repeatedly in this manner.

Figure 3:
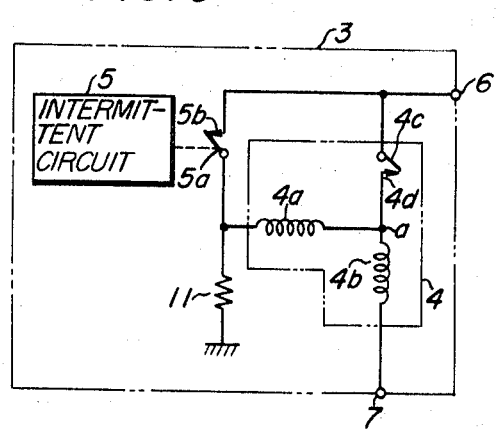

Still another embodiment of the present invention is shown in FIG. 3. This embodiment differs from the aforesaid second embodiment in that the resistor 11 is displaced from the power source terminal side to the ground side, and the normally closed fixed contact 5b and movable contact 5a are moved to the power source terminal side in place of the contacts 5a, 5c. The basic operation of this embodiment is exactly the same as that of the embodiment shown in FIG. 2.

Figure 4:
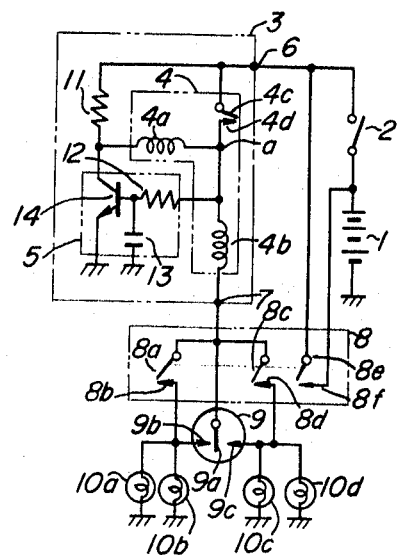

FIG. 4 shows still another embodiment of the present invention, wherein the intermittent circuit 5 is not independent. As shown, the power source terminal 6 has the resistor 11 and the movable contact 4c of the relay 4 connected thereto and said resistor 11 is connected at the other end to the connection between the collector of a transistor 14 and the voltage coil 4a of relay 4. The other end of the voltage coil 4a is connected to the connection a between the fixed contact 4d of the relay 4, and the current coil 4b and a resistor 12. A condenser 13 is connected at one end to the connection between the other end of the resistor 12 and the base of the aforesaid transistor 14. The other end of the condenser 13 and the emitter of the transistor 14 are grounded respectively. The current coil 4b is connected at the other end to the turn signal lamps 10a, 10b, 10c and 10d through the turn signal switch 9 and the hazard warning switch 8 via the output terminal 7. With the arrangement described, when the movable contact 9a of the turn signal switch 9 is contacted with the fixed contact 9b while the supply voltage is imposed on the power source terminal 6 upon actuation of the power switch 2, a current flows through a circuit composed of the power source terminal 6, resistor 11, current coil 4b and turn signal lamps 10a, 10b and also a current flows into the condenser 13 through the resistor 12 to charge said condenser, so that the base potential of the transistor 14 rises gradually from zero. The normally open contacts 4c, 4d are closed by the magnetomotive force of the voltage coil 4a and thus the turn signal lamps 10a, 10b are put on. In the meantime, the base potential of the transistor 14 rises with the base current thereof flowing through said transistor, so that said transistor is energized and the collector potential becomes substantially zero. As a result, the direction of the current passing through the voltage coil 4a is reversed with respect to that in the case of actuating the movable contact 4c as mentioned above and similarly the direction of the magnetomotive force is reversed with respect to that of the current coil 4b, so that the movable contact 4c is opened and the turn signal lamps 10a, 10b are put off. In this case, the condenser 13 has been charged with a current flowing thereinto from the power source terminal 6 through the movable contact 4c, so that immediately upon opening of said movable contact the current discharged by the condenser 13 flows through the current coil 4b and turn signal lamps 10a, 10b. Therefore, the base potential of the transistor 14 drops and upon deenergization of said transistor, a current flows again from the power source terminal 6 into the voltage coil 4a through the resistor 11, putting the turn signal lamps 10a, 10b on. Thereafter, the turn signal lamps are put on and off repeatedly. Although the operation of the embodiment shown in FIG. 4 has been described above with reference to the case wherein the turn signal switch 9 is operated, exactly the same operation will take place when all of the turn signal lamps are blinked by way of the hazard warning switch 8.

In the arrangement shown in FIG. 4, when one of the turn signal lamps 10a, 10b is burned out, with the other remaining one being in normal condition, the movable contact 4c is connected with the fixed contact 4d by the function of the voltage coil 4a and then opened after having been maintained in contact therewith for a short period by the rush current for the remaining turn signal lamp passing through the current coil 4b. In this case, however, since the condenser 13 has not been sufficiently charged, the base potential of the transistor 14 is substantially zero and accordingly said transistor has not been energized. Therefore, a current flows into the voltage coil 4a again from the power source 1 through the resistor 11 and after all the movable contact 4c is engaged and disengaged at a high frequency. Namely, such flashing of the lamp can be distinguished over the normal flashing and thereby the purpose of indicating a burnout of one lamp can be attained.

FIGS. 5 and 6 show still other embodiments which a like that shown in FIG. 4, are provided with a nonindependent intermittent circuit 5. In describing first the embodiment shown in FIG. 5, it is different from the embodiment of FIG. 4 in that the condenser 13, transistor 14 and resistor 11 are connected reversely with the power source terminal 6 and the ground. The power source terminal 6 is impressed with the supply voltage and the output terminal 7 has the turn signal lamps connected thereto. The transistor 14 in this embodiment is of the PNP-type, with the emitter thereof connected to the power source terminal 6. When the turn signal lamps are connected to the output terminal 7, a current flows through the power source terminal 6, condenser 13, resistor 12, current coil 4b and turn signal lamps. As the base potential of the transistor 14 approaches gradually from the supply voltage to the ground potential, said transistor is energized and a current passes therethrough from the power source terminal 6 to the voltage coil 4a and the movable contact 4c is brought into contact with the fixed contact 4d by the magnetomotive force of said voltage coil, whereupon the turn signal lamps are put on and simultaneously the magnetomotive force of said voltage coil disappears, and the current stored in the condenser 13 is discharged through a closed circuit composed of the movable contact 4c, fixed contact 4d and resistor 12. As the base potential of the transistor 14 approaches the supply voltage and said transistor has been deenergized, a current flows from the power source terminal 6 through the movable contact 4c into a path consisting of the voltage coil 4a, resistor 11 and the ground. Since the magnetomotive force generated in the voltage coil 4a in this case is of a direction opposite to that of the current coil 4b by which the movable contact 4c is maintained in its position, these magnetomotive forces are offset by each other, so that the movable contact 4c is opened and the turn signal lamps are put out. In the manner described, the turn signal lamps are put on and out repeatedly.

Next, the embodiment shown in FIG. 6 will be explained. The power source terminal 6 has resistors 11, 17 and the movable contact 4c of the relay 4 connected thereto, and to the other end of the resistor 11 are connected the collector of a transistor 16 and the voltage coil 4a of relay 4. The resistor 17 is connected at the other end to the connection between the collector of the transistor 15 and the base of the transistor 16. The base of the transistor 15 is connected to the normally closed fixed contact 4e of relay 4 through resistors 12, 18. The condenser 13 is connected to the connection between the resistors 12 and 18 and to the other end of said condenser 13 is connected the output terminal 7 through the current coil 4b, along with the normally open fixed contact 4d of relay 4 and the voltage coil 4b. The emitters of the transistors 15, 16 are grounded. With the arrangement described, when the power source 1 is connected to the power source terminal 6 and then the turn signal lamps not shown are connected to the output terminal 7, a circuit is formed leading to the ground through the resistor 11, voltage coil 4a, current coil 4b and turn signal lamps, and also a circuit is formed leading to the ground through the movable contact 4c, normally closed fixed contact 4e, resistor 18, condenser 13, current coil 4b and direction indicator lamps, with a current flowing through said circuits. Since the potential at the connection between the condenser 13 and the resistors 18, 12 becomes zero with respect to the ground, the base potential of the transistor 15 also becomes zero, deenergizing said transistor, so that a positive potential is imposed on the connection between the resistor 17, and the collector of the transistor 15 and the base of the transistor 16, energizing said transistor 16. Therefore, the potential at the connection between the resistor 11, and the collector of the transistor 16 and the voltage coil 4a drops to substantially zero and no current passes through the voltage coil 4a. The potential at the connection between the resistors 12, 18 and the condenser 13 rises gradually as the condenser 13 is charged and when a current is supplied to the base of the transistor 15 to energize said transistor, the base and the emitter of transistor 16 are shorted deenergizing said transistor 16 and a current flows through the voltage coil 4a via the resistor 11 from the power source terminal 6, whereby the movable contact 4c is brought into contact with the normally open fixed contact 4d by the magnetomotive force of said voltage coil 4a. Consequently, a current flows through the turn signal lamps not shown from the power source terminal 6 via the current coil 4b, to put said lamps on and the movable contact 4c is held in its engaged position by the magnetomotive force of the current coil 4b. The magnetomotive force of the voltage coil 4a disappears at the instant that the movable contact 4c contacts the normally open fixed contact 4d. The condenser 13 is supplied with a current from the power source terminal 6 via the normally open contacts 4c, 4d, and the energized state of the transistor 15 and the deenergized state of the transistor 16 are maintained for a while. When the current supply to the base of transistor 15 has been stopped upon completion of charging of the condenser 13, said transistor 15 is deenergized while the transistor 16 is energized, so that a current is supplied to the voltage coil 4a through the power source terminal 6, movable contact 4c, normally open fixed contact 4d, current coil 4a and transistor 16. The magnetomotive force generated by this current is opposite in direction to that which has caused the turn signal lamps to be put on, and offset by the self-held magnetomotive force of the current coil 4b generated by the current passing through said turn signal lamps. Yet further, the magnitude of the opposite magnetomotive force caused by the voltage coil 4a is sufficiently large as the current supplied to said voltage coil does not pass through the resistor 11 and is of such a magnitude which is large enough to offset the magnetomotive force of current coil 4b which is large in use of the apparatus for hazard warning because the number of the turn signal lamps used increases and accordingly the current flowing through the current coil 4b increases. In this manner, the movable contact 4c which has been self-held by the magnetomotive force of the current coil 4b, is again returned toward the normally closed fixed contact 4e under the opposite magnetomotive force of the voltage coil 4a. In this case, since the connection a between one end of the condenser 13, and the normally open fixed contact 4d, voltage coil 4a and current coil 4b, is essentially grounded via the direction indicator lamps and further the one end of the condenser 13 has been charged with a positive potential, the connection between the other end of said condenser 13 and the resistors 12, 18 becomes negative in potential and the turn signal lamps not shown remain out until said potential rises to zero and further rises to reach a positive value at which a base current is supplied to the transistor 15. The lamps flash in the manner described. The result of the actual experiment conducted with the embodiment shown in FIG. 6 will be shown hereunder. In the experiment, a coil of 100Ω was used for the voltage coil 4a of relay 4, a resistor of 68 KΩ for the resistor 12, a resistor of 39 KΩ for the resistor 18, a condenser of 10μf. for the condenser 13, a resistor of 100 for the resistor 11 and a resistor of 1.8 KΩ for the resistor 17. Further, a power source of DC 12 v. was used for the power source 1 and lamps of 25w. (32 cp.) were used for the turn signal lamps 10a, 10b, 10c and 10d. In the normal turn signal operation, the lamps flashed at a frequency of 0.71 second and the duration of lighting of the lamps was 0.31 second. When one of the lamps burned out, the remaining lamp flashed at a frequency of 0.35 second and the lighting duration of the lamp was 0.09 second. On the other hand, when the apparatus was used as a hazard warning flasher, the lamps were flashed at a frequency of 0.72 second and the lighting duration was 0.32 second.

It is to be understood that the normally open contacts 4c, 4d of relay 4, in the embodiment shown in FIG. 6, may be replaced by the normally closed contacts 4c, 4d by modifying the arrangement of the associated circuit to some extent.

What is claimed is:

1. A flasher circuit for vehicles comprising:
   a lamp load,
   a source terminal adapted to be connected to a power source,
   an output terminal connected to said lamp load,
   an intermittent circuit, including first switch means having a switch output, for periodically switching said first switch means between a first condition in which said switch output is at a first voltage and a second condition in which said switch output is at a second voltage,
   means for connecting said first switch means to said source terminal and to ground,
   a relay including a voltage coil connected at one end to said switch output of said first switch means so that a forward current from said power source flows through said voltage coil when said first switch means is in said first condition and accordingly said switch output is at said first voltage and a reverse current flows through said voltage coil when said first switch means is in said second condition and accordingly said switch output is at said second voltage, a current coil connected at one end to the other end of said voltage coil and at the other end to said output terminal and second switch means controlled by said voltage and current coils for switching between an open and closed condition and connected between said source terminal and said one end of said current coil, said current coil and second switch means being connected in series between said source terminal and said output terminal for carrying a load current from said power source to said lamp load, said current coil being connected to said voltage coil and said second switch means so that the voltage at said other end of said voltage coil is less than said first voltage when said second switch means is in said open condition and said first switch means is in said first condition so that said forward current flows through said voltage coil and to said output terminal via said current coil and so that the voltage at said other end of said voltage coil is greater than said second voltage when said second switch means is in said closed condition and said first switch means is in said second condition so that said reverse current flows through said voltage coil, said second switch means being closed by the flow of forward current through said voltage coil and being held in said closed condition thereafter by the flow of said load current through said current coil and said second switch means when said second switch means is in said closed condition, said second switch means being further opened by the flow of reverse current through said voltage coil.

2. A flasher for vehicles according to claim 1 wherein said current coil is arranged such that said second switch means is held in said closed condition by force of said current coil only when said load current is not less than a predetermined value.

3. A flasher for vehicles according to claim 1, wherein said voltage coil is connected in parallel with said second switch means in the first condition of said first switch means and connected between said source terminal and ground through said first switch means in the second condition of said first switch means.

4. A flasher for vehicles according to claim 1 wherein said voltage coil is fixedly connected in parallel with said second switch means through a resistance and connected between said source terminal and ground through said second switch means and said first switch means when said first switch means is in said second condition.

5. A flasher for vehicles according to claim 4, wherein said intermittent circuit and said first switch means comprise a transistorized circuit.

6. A flasher for vehicles according to claim 5, wherein said transistorized circuit includes two transistors, the base of the one transistor being directly connected with the collector of the other transistor, the base of which is connected with the junction of said current coil and said second switch means through a capacitor.

7. A flasher for vehicles according to claim 1, wherein said voltage coil is connected in parallel with said second switch means when said first switch means is in said first condition and the junction of said voltage coil and said first switch means is fixedly connected with ground.

8. A flasher for vehicles according to claim 7, wherein said intermittent circuit and said first switch means comprise a transistorized circuit.

9. A flasher for vehicles according to claim 1, further comprising a turn signal switch, and a hazard warning switch which are both connected between said output terminal and said lamp load, and said lamp load including two groups of lamps, said output terminal being selectively connected to either one of said two groups of lamps through said turn signal switch and being connectable to both said two groups simultaneously through said hazard warning switch.

* * * * *